M. H. ALLEN.
MECHANICAL MOVEMENT.

No. 174,460. Patented March 7, 1876.

ATTEST:
Arthur C. Fraser.
George W. Thatcher.

INVENTOR:
Myron H. Allen
Per Burke & Fraser
Attorneys

UNITED STATES PATENT OFFICE.

MYRON H. ALLEN, OF NEW BRUNSWICK, NEW JERSEY.

IMPROVEMENT IN MECHANICAL MOVEMENTS.

Specification forming part of Letters Patent No. 174,460, dated March 7, 1876; application filed June 18, 1875.

*To all whom it may concern:*

Be it known that I, MYRON H. ALLEN, of New Brunswick, in the county of Middlesex and State of New Jersey, have invented certain Improvements in Mechanical Movements, of which the following is a specification:

My invention relates to that class of devices for converting motion in which rotating cams produce a reciprocating motion of lever-arms without the intervention or use of gear-wheels.

The improvements will be fully hereinafter described, and specifically pointed out in the claims.

Figure 1:
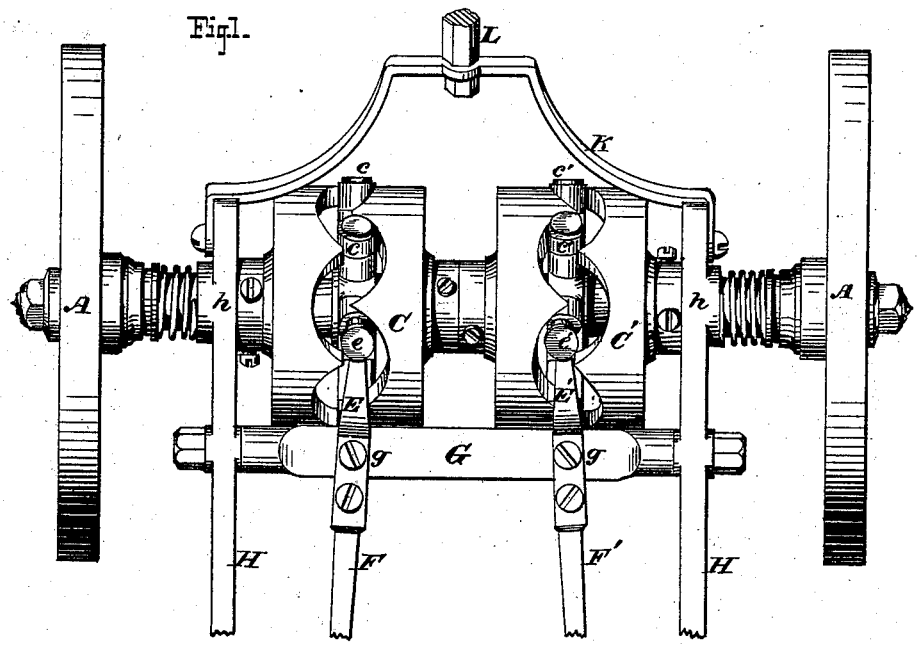
Figure 2:
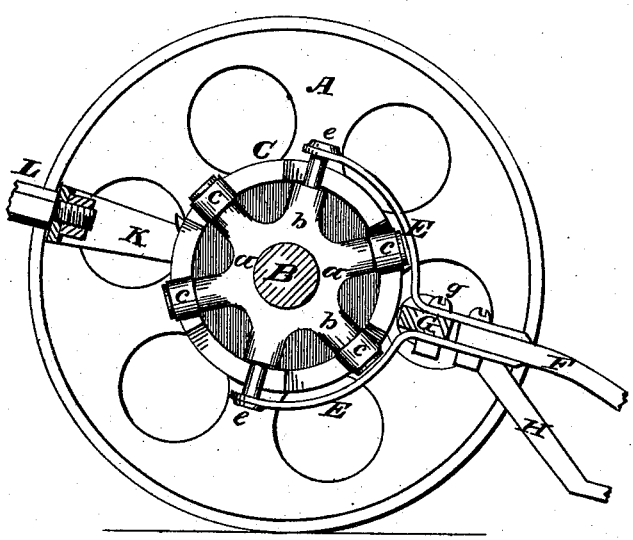

In the drawings, Figure 1 is a plan of my improved mechanical movement. Fig. 2 is a longitudinal vertical section of the same through one of the cam-drums.

Like letters of reference designate corresponding parts in all of the figures.

My invention may be adapted, without material change, to field-mowers in general.

Let A A represent ordinary ground-wheels, mounted upon an axle, B, and provided with the usual clutches, by which the machine may be run backward without revolving the axle. The clutches may be provided with suitable forks and levers for disengaging the same, if deemed desirable. Mounted rigidly upon the axle B, and at suitable distances apart, are two hollow drums, C C', each provided with zigzag cam-slots, as shown. These drums are precisely alike in construction, but are arranged upon the axle in reverse order, as will be explained further on. Mounted loosely upon the axle, within the hollows of the cam-drums, are spiders D D', to which are coupled the yokes E E' of the levers F F'.

As each cam-drum and its co-operative parts or adjuncts correspond precisely in the details of construction with the other drum and its adjuncts, it will only be necessary to describe one.

The spider D is composed of a boss, $a$, bored to receive the axle B, and provided with radial arms $b\ b$, equally spaced, and projecting therefrom, as shown. The ends of these arms engage the zigzag slot in the drum C.

To reduce the friction and abrasion of parts as much as possible, I prefer to provide the end of each arm with a friction-roller, $c$, of steel.

There must be at least two arms to the spider, and there may be more. I prefer to use six, as shown. I prefer, also, that the number of arms be even, so that each arm may have a corresponding one on the diametrically-opposite side. In this case the number of scallops or zigzags in the cam-slot should also be even, for obvious reasons, and the number of arms in the spider should not exceed them.

Two opposite arms of the spider are extended somewhat, to form wrists $e\ e$, by which the yoke E is attached. The yoke is secured to the lever F, which has a fulcrum at $g$, formed by a bolt, which passes through a cross-bar, G.

I have shown no friction-rollers on the pair of radial arms to which the yoke E is attached; but they might be used on these as well as the others, if deemed necessary.

This invention is especially designed for driving the cutter-bars of mowing-machines in general.

Although I have shown no housing, the operative mechanism may be incased to keep out rubbish and other foreign substances, if desired.

Having thus described my invention, what I claim as new is—

1. The combination of a rotating drum, having a cam slot or groove and an even number of scallops or zigzags, with two or more studs engaging said groove or slot in pairs on diametrically-opposite sides, when the said studs are rigidly secured together, substantially as described.

2. The spider D, having a boss, $a$, and radial arms $b\ b$, provided with friction-rollers $c\ c$, to engage the slot in the drum C, and wrists $e\ e$, to receive the yoke E, substantially as shown and specified.

In witness whereof I have hereunto signed my name in the presence of two subscribing witnesses.

MYRON H. ALLEN.

Witnesses:
WOODBRIDGE STRONG,
GEO. B. MUNN.